United States Patent [19]

Schick

[11] Patent Number: 4,789,092

[45] Date of Patent: Dec. 6, 1988

[54] APPARATUS FOR FASTENING STIRRUP-LINKS ON A CONVEYOR-BELT OR THE LIKE

[75] Inventor: Jean-François Schick, Paris, France

[73] Assignee: Goro S.A., Chelles, France

[21] Appl. No.: 937,860

[22] Filed: Dec. 4, 1986

[30] Foreign Application Priority Data

Dec. 4, 1985 [FR] France .................. 85 17918

[51] Int. Cl.[4] .............................................. B25C 7/00
[52] U.S. Cl. ...................... 227/111; 227/143; 227/152; 29/243.51
[58] Field of Search ............... 227/4, 110, 152, 111, 227/143; 29/243.51

[56] References Cited

U.S. PATENT DOCUMENTS

| | | | |
|---|---|---|---|
| 3,101,481 | 8/1963 | Neale | 29/243.51 |
| 3,142,842 | 8/1964 | Neale | 227/143 |
| 3,261,085 | 7/1966 | Hobson | 227/19 X |
| 3,458,099 | 7/1969 | Schick | 227/111 |
| 4,440,336 | 4/1984 | Kifor | 227/111 X |

FOREIGN PATENT DOCUMENTS

| | | |
|---|---|---|
| 1364286 | 6/1963 | France . |
| 2327451 | 5/1977 | France . |
| 2507728 | 8/1985 | France . |
| 1325063 | 8/1973 | United Kingdom . |

Primary Examiner—E. R. Kazenske
Assistant Examiner—James L. Wolfe
Attorney, Agent, or Firm—Pollock, VandeSande & Priddy

[57] ABSTRACT

A portable apparatus is provided with an operating head slidably mounted on a guide plate for successively fastening stirrup-links on the end of a conveyor belt via staples. A movable die within the operating head for clinching the staple ends has a first portion located opposite to the staple-inserting punch and provided with grooves for initial clinching of the staple ends. A second portion of the die is provided with grooves for final clinching of the staple ends of the following stirrup-link which have already been subjected to initial clinching. A second punch penetrates into an opening of the staple-guiding plate in order to arrest the operating head in each predetermined position and to serve as an anvil for bearing against the head of each staple at the time of final clinching. The second punch is actuated by a lever which also actuates the stepping-motion ratchet mechanism while another lever controls the operation of the staple-inserting punch and the operation of the die.

7 Claims, 8 Drawing Sheets

APPARATUS FOR FASTENING STIRRUP-LINKS ON A CONVEYOR-BELT OR THE LIKE

BACKGROUND OF THE INVENTION

1. Field of the Invention

The present invention relates to the fastening of a row of stirrup-links on the end of a conveyor-belt or the like.

More specifically, the invention is concerned with the attachment of stirrup-links consisting of U-shaped coupling members adapted to be mounted astride each end of a conveyor-belt and secured by means of wire staples having the shape of an inverted U. The fastening operation is performed by inserting the staples through holes provided in the two arms of these coupling members or so-called stirrup-links and then clinching the pointed ends of the staples which project from said stirrup-links.

2. Description of the Prior Art

In order to facilitate their insertion, the above-mentioned coupling members initially have a V-shape, one arm of each coupling member being divergent or directed outwards from its normal position. Under these conditions, when the end of a conveyor-belt or the like has been placed between the coupling members of the row to be fixed in position, it is first necessary to bend-back the arm which had initially been opened-out before proceeding to insert the fastening staples and clinching the ends of the staples.

A certain number of devices designed to carry out these different operations are already in existence at the present time. A typical device has two jaws which are capable of moving in opposite directions or else a driving punch and an anvil which are also mounted so as to be capable of moving in opposite directions. These elements are actuated by a relatively complex drive mechanism which is capable of successively performing the different movements required for carrying out the prescribed operations, namely those which consist in closing the opened-out arms of the coupling members, then inserting the fastening staples and finally clinching their free pointed ends. By reason of the very complexity of their drive mechanism, these devices in fact constitute heavy and cumbersome machines which cannot readily be used at the bottom of driftways or mine galleries. Furthermore, the relative fragility of these devices is also a serious obstacle to their use in mine galleries or on public works and civil engineering construction sites.

Among the different types of fasteners which are in current use, the device described in French patent No. 2,327,451 is worthy of mention. This apparatus comprises an operating head provided with inserting jaws actuated by a lever mechanism. In addition, bending tools are provided for bending-back the free ends of the fastening staples, these tools being displaced transversely with respect to the direction of insertion. However, the operating mechanism provided in this apparatus is particularly complex, thus giving rise to the disadvantages mentioned earlier.

In an apparatus described in French Pat. No. 2,507,728, provision is made for a movable cover which has the same length as the row of coupling members to be fixed in position and which is intended to be applied against the opened-out arms of these latter in order to ensure simultaneous closure of all the coupling members. This cover has a series of openings for receiving the heads of the fastening staples which are mounted in a standby position on the arms of the coupling members. These openings are subsequently intended to receive a punch for inserting the staples one after the other in succession. During this operation, the pointed staple ends are subjected to an initial clinching operation after passing through the coupling members, this being achieved by means of sloping-bottom grooves formed in a stationary anvil located beneath the assembly. However, it is then necessary to place the coupling members on another anvil having a smooth surface in order to permit completion of the operation which consists in clinching the staple ends. This has the effect of complicating the operations to be performed.

For the reasons given in the foregoing, the aim of the present invention is to provide a belt-fastening apparatus so designed as to have an operating mechanism which is as simple as possible while being at the same time very easy to use. Moreover, the design concept of this apparatus is such that this latter can be readily transported and used at the bottom of a mine gallery or at any other location.

SUMMARY OF THE INVENTION

The apparatus in accordance with the invention is intended to fasten on the end of a conveyor belt a row of stirrup-links provided with fastening staples placed in a standby position. Said apparatus includes an operating head slidably mounted on a plate for guiding said fastening staples and provided on each side of the row of stirrup-links to be attached with a staple-inserting punch and a movable die for clinching the pointed ends of the staples. A ratchet mechanism is provided for producing step-by-step motion of the operating head opposite to the different stirrup-links to be fastened.

The distinctive feature of this apparatus lies in the fact that the movable die of its operating head is made up of two separate and distinct portions. A first portion of said die is placed opposite to the staple-inserting punch and provided with grooves having sloping bottom faces for initial clinching of the staple ends of a predetermined stirrup-link. A second portion of said die is provided with grooves for final clinching of the staple points of the following stirrup-link which have already been subjected to initial clinching. Provision is made opposite to said second portion of the die for a second punch which is intended to penetrate into the corresponding opening of the staple-guiding plate both in order to arrest the operating head in the exact position desired and in order to serve as an anvil for bearing against the head of each corresponding staple at the time of final clinching of the staple points. The second punch aforesaid is actuated by a lever which also actuates the stepping-motion ratchet mechanism while another lever controls the operation of the staple-inserting punch and the operation of the die.

Thus in each of its positions, the operating head makes it possible to carry out clinching of the pointed ends of the corresponding fastening staples on a predetermined stirrup-link and to carry out closing of the initially opened-out arm of the following stirrup-link, this operation being followed by insertion of the corresponding staples and initial clinching of the staple ends. Final clinching is then performed when the operating head is moved to the next position, and so on in sequence.

In accordance with another distinctive feature of the apparatus under consideration, the lever which serves to actuate the staple-inserting punch and the movable die is connected to these two elements by mechanical control means for successively producing a displacement of the movable die towards the conveyor belt during the first part of the movement imparted to the operating lever and then a displacement of the staple-inserting punch during the second part of this movement.

DETAILED DESCRIPTION OF THE INVENTION

Figure 9:
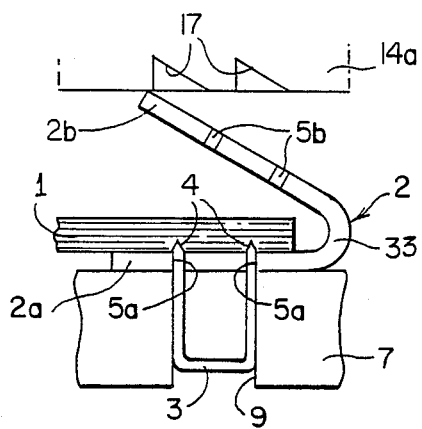
FIGS. 9 and 11 are schematic fragmentary transverse sectional views taken respectively along lines IX—IX of FIG. 5, X—X of FIG. 6 and XI—XI of FIG. 7, and illustrating three distinct operations performed successively on one and the same stirrup-link in a predetermined position of the operating head.

As mentioned earlier, the apparatus in accordance with the invention is so designed as to carry out the different operations required for fastening a row of stirrup-links 2 on the end of a conveyor belt in order to join this end to another end of the belt. The stirrup-links to be fixed in position consist of U-shaped coupling members having two arms 2a and 2b joined together by hinge-knuckles 33 which are intended to be united by a pin with the hinge-knuckles of another similar row of stirrup-links. One of the two arms of said stirrup-links (the arm 2a, for example) is adapted to carry two fastening staples 3 made of wire and each having the shape of an inverted U. These staples are then mounted in the standby position. In other words, the pointed ends 4 of said staples are engaged within through-holes 5a provided in the stirrup-link arm considered. Said fastening staples are therefore arranged so as to project externally of the stirrup-links (as shown in FIG. 9). As to the opposite stirrup-link arm 2b, this arm is provided at the outset with an "opened-out" shape or, in other words, extends outwards with respect to the normal position in which this arm is subsequently located in parallel relation to the other arm.

Figure 1:
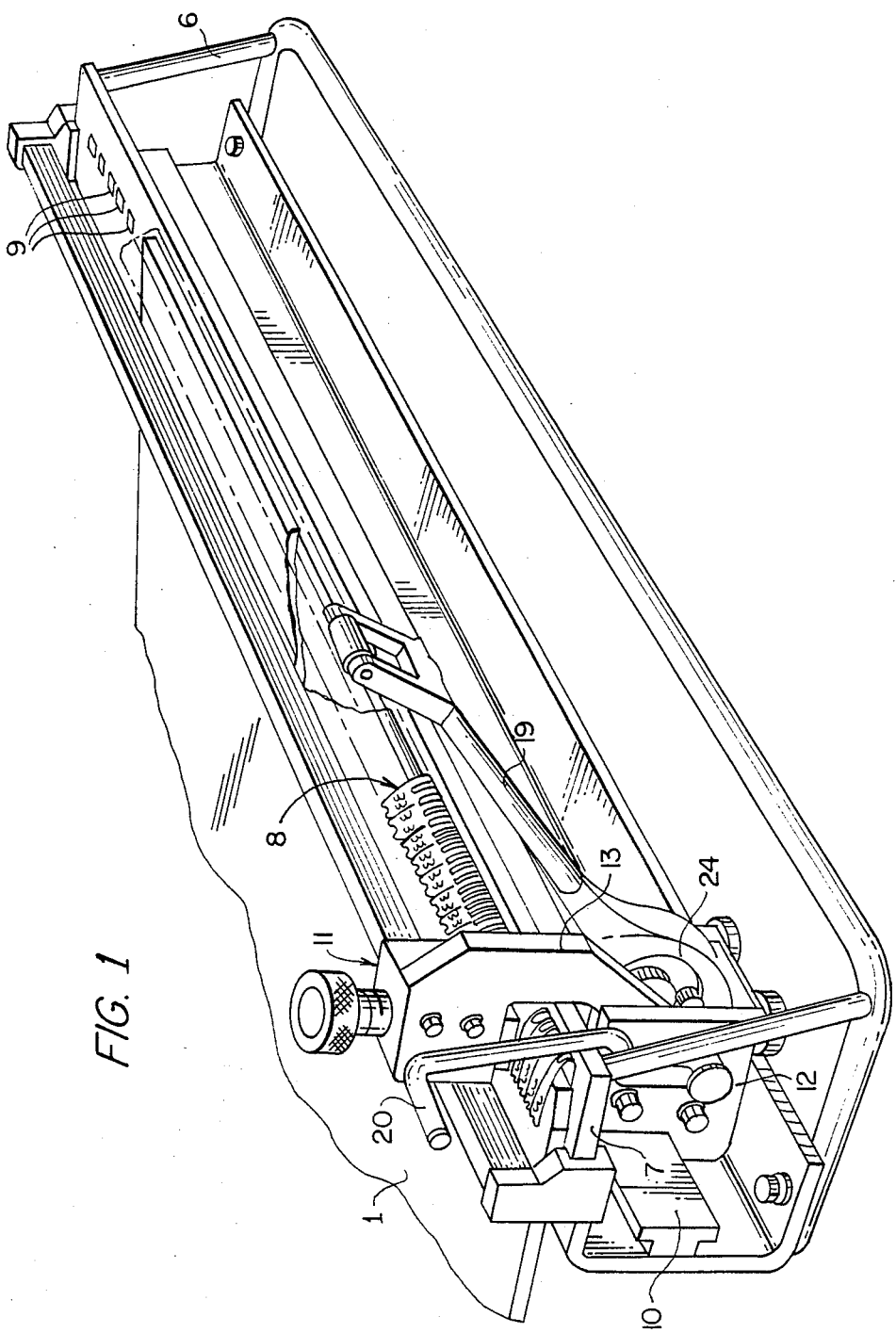
FIG. 1 is a perspective view of the complete apparatus in accordance with the invention.
Figure 2:
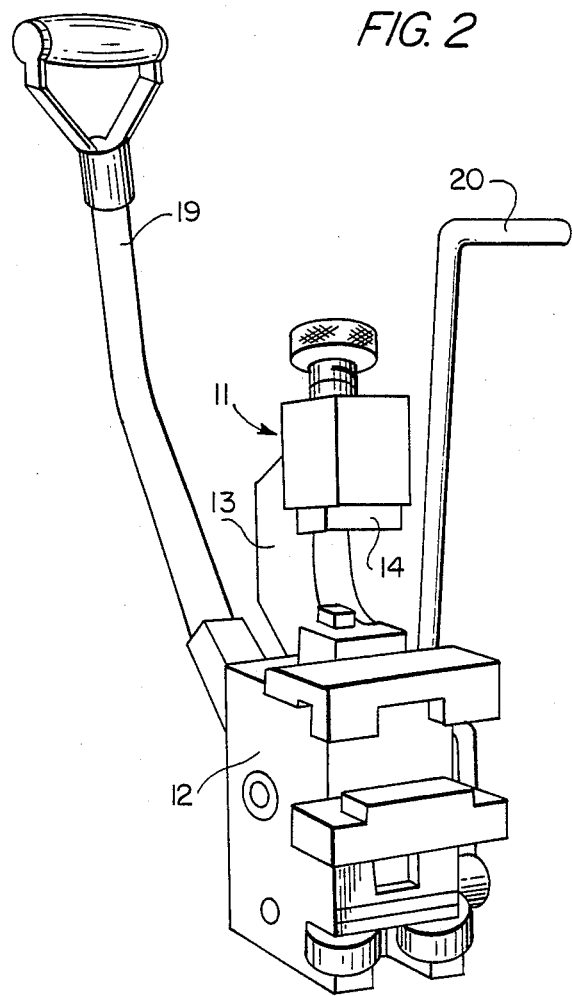
FIG. 2 is a perspective view of the operating head of said apparatus.
Figure 3:
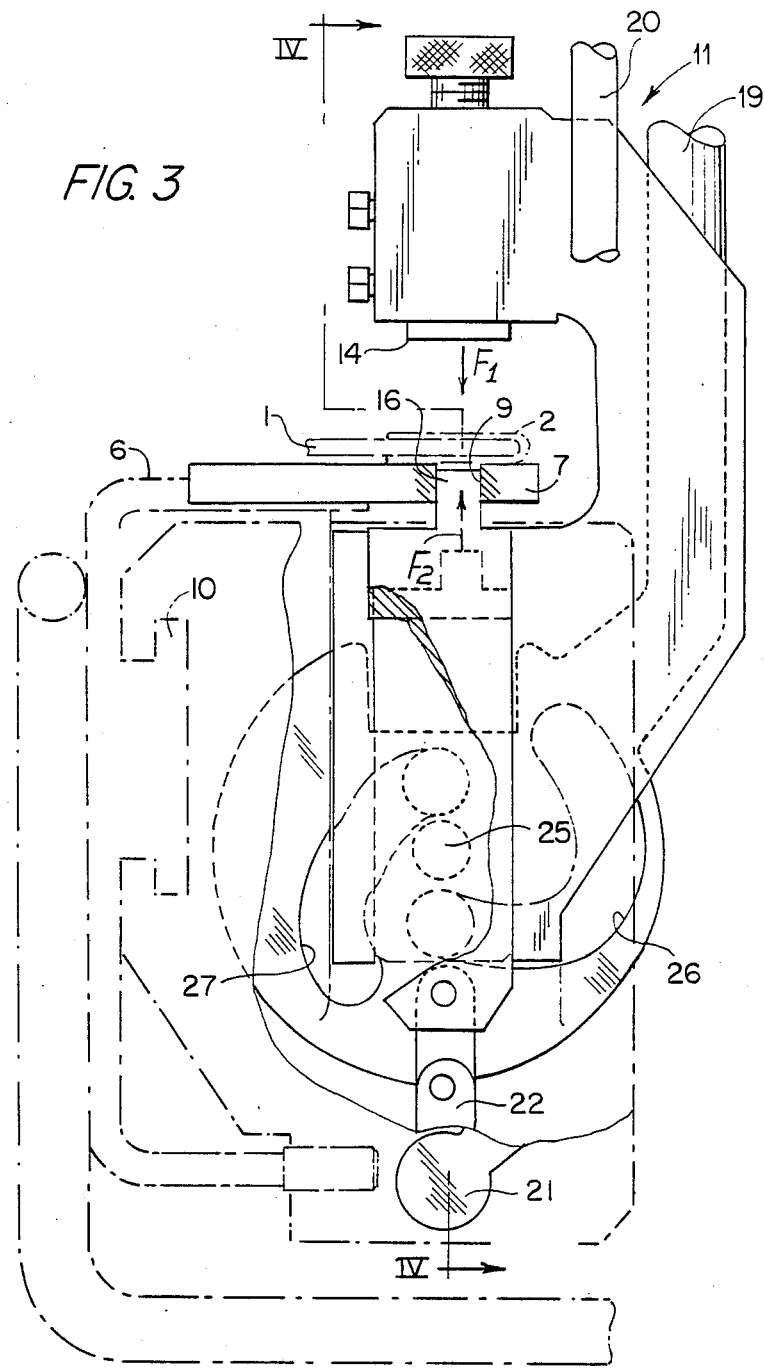
FIG. 3 is a view in side elevation of said operating head.

The apparatus under consideration includes a frame 6 for supporting a plate 7, the intended function of which is to support the row 8 of stirrup-links to be fixed on the edge of the conveyor belt 1. In consequence, the length of the frame 6 and of the plate 7 is slightly greater than the width of the conveyor belt 1 so that the end of said belt can be placed on the plate 7 as shown in FIG. 1, the stirrup-links 2 being then placed astride the edge of said conveyor belt.

However, the plate 7 also has the function of guiding the fastening staples 3 at the time of insertion of these latter. To this end, said plate is provided with a series of openings 9, each opening being intended to receive the two fastening staples 3 which are mounted in a standby position on the arm 2a of a predetermined stirrup-link. Under these conditions, the conveyor belt 1 and the row of stirrup-links 8 should be placed in a position in which the stirrup-links are so oriented as to ensure that their arms 2a are directed downwards in order to permit engagement of the fastening staples 3 in the openings 9 of the guide plate 7. It should further be noted that this arrangement achieves strictly accurate positioning of the stirrup-links.

The frame 6 also supports a rail 10 on which the operating head of the apparatus considered is slidably mounted, said operating head being designated by the general reference 11. The body 12 of said head is placed beneath the guide plate 7 but is equipped with a vertical slider 13 of gooseneck shape, the upper end of which is located above the row 8 of stirrup-links. The upper end of said slider is adapted to carry a movable die 14 which is intended to be clamped against the top portion of the stirrup-links and which will be described in detail hereinafter.

In regard to the lower portion or body 12 of the operating head, said body is adapted to carry two punches designated respectively by the references 15 and 16. The punch 15 is intended to insert the fastening staples 3 of a predetermined stirrup-link in each work position of the head 11. The punch 16, however, is intended to perform two different functions as follows: first of all the function of accurately arresting the operating head 11 in each of its successive work positions and then the function of an anvil for supporting the heads of the fastening staples 3 of a stirrup-link at the time of final clinching of the ends of said staples.

Figure 11:
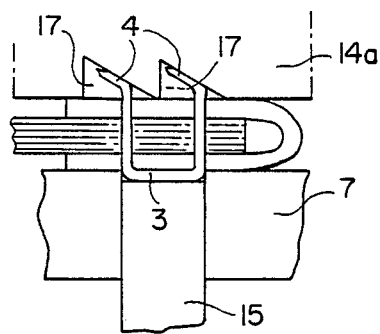
Figure 12:
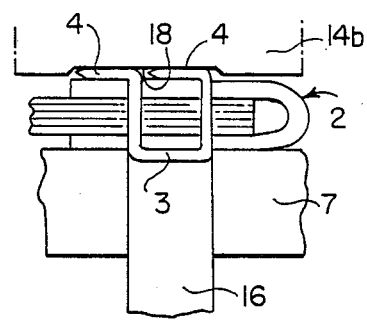
FIG. 12 is a schematic fragmentary transverse sectional view taken along line XII—XII of FIG. 6 and illustrating the operation of final clinching, or bending-back of the pointed ends of the staples against link.

The two punches 15 and 16 mentioned above are placed opposite to two separate and distinct portions 14a and 14b of the die 14. The first portion 14a which is located opposite to the staple-inserting punch 15 is provided with grooves 17 having a relatively substantial depth and a sloping bottom face so as to be capable of initial clinching of the projecting ends 4 of the fastening staples 3 when these latter are inserted through a predetermined stirrup-link 2. At this stage, said staple ends are thus inclined at an angle of 45° as shown in FIG. 11. In regard to the second portion 14b of the die 14, this portion is provided with two grooves 18 which have a small depth and the bottom face of which is parallel to the external face of the die. These grooves are thus capable of ensuring final clinching of the staple ends 4 after these latter have already been bent-back to an angle of 45° as shown in FIG. 11. During this operation, the second punch 16 performs the function of an anvil against which the heads of the corresponding staples are applied.

Figure 4:
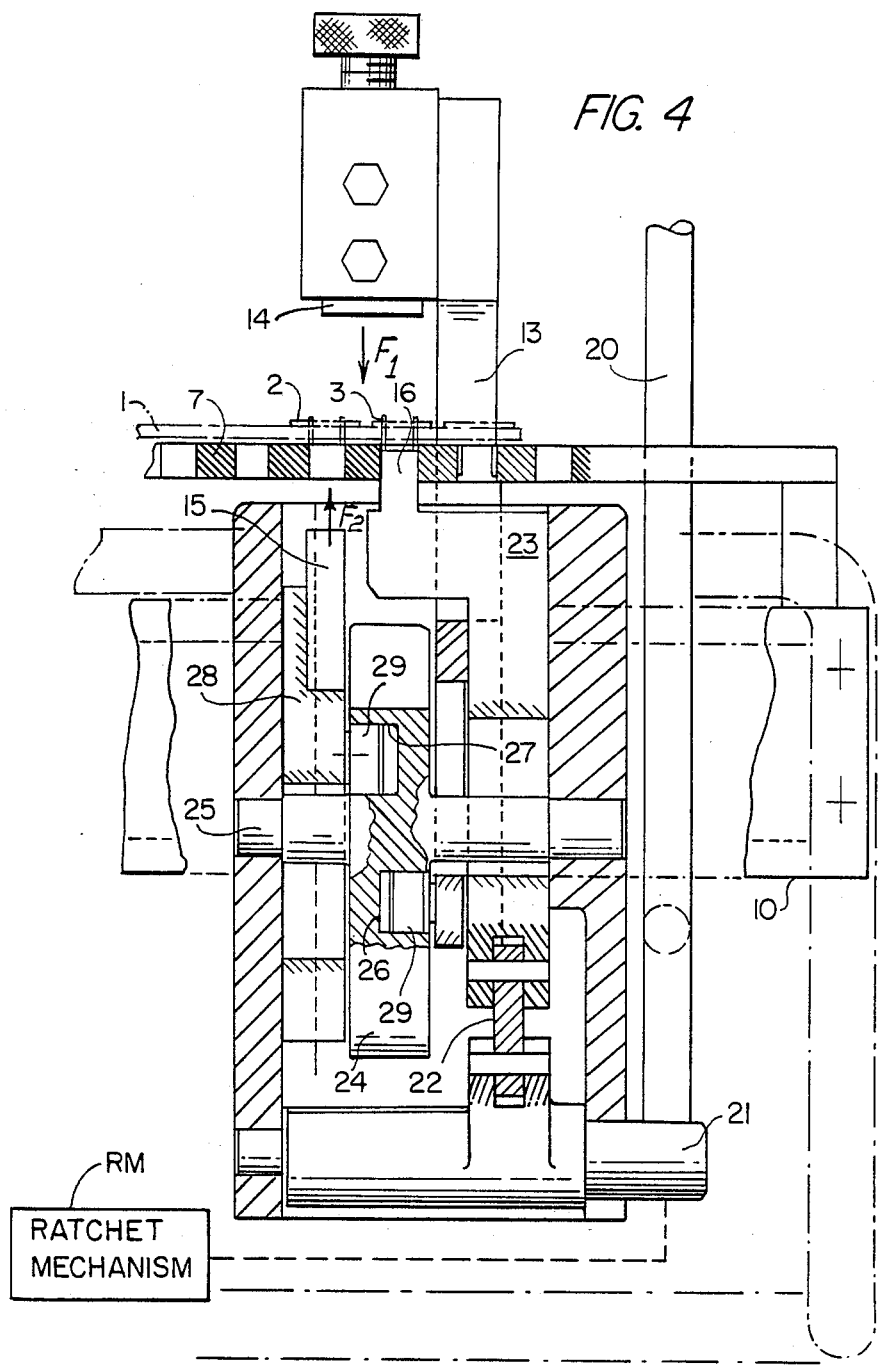
FIG. 4 is a sectional view taken along line IV—IV of FIG. 3.

The operating head 11 is provided with two control levers 19 and 20 respectively. The first lever 19 controls both the displacements of the upper die 14 and those of the first punch 15 which has the function of inserting the staples 3. The second lever 20 serves to actuate both the second punch 16 and a ratchet mechanism to (shown as a box RM working cooperatively with a rotary shaft 21, to be discussed below) for producing step-by-step motion of the operating head 11 from one work position to the next. The mechanical arrangement is such that said second lever produces action first on the stepping-motion ratchet mechanism and then on the second punch 16. With this objective, the lower end of said lever is fixed on a rotary shaft 21, said shaft being coupled by means of a toggle mechanism 22 with a slide-block 23 which is adapted to carry the second punch 16 (as shown in FIG. 4).

So far as the first lever 19 is concerned, this lever is rigidly fixed to a vertical plate 24 rotatably mounted on a shaft 25. In both faces of said plate are formed two channels 26 and 27 which are intended to serve as control cams respectively for the slider 13 which carries the upper die 14 and for a slide-block 28 which carries the first staple-inserting punch 15. Rollers 29 carried by each of these two components are engaged in said two channels 26 and 27. Now the profile of these two channels is such that, when the lever 19 is operated, it first produces action solely on the slider 13 in order to cause this latter to move down towards the conveyor belt in the direction of the arrow F1, then on the slide-block 28 in order to lift the punch 15 in the direction of the arrow F2. However, during this second stage, the arrangement is such that the slider 13 is maintained in the bottom position, thus ensuring that the die 14 is applied against the top arms of the corresponding stirrup-links 2.

When the end of the conveyor belt 1 has been placed on the guide plate 7 with a row 8 of stirrup-links as shown in FIG. 1, it is necessary to drive the operating head 11 in stepping motion in order to close the stirrup-links and carry out attachment of the staples 3. As already mentioned, the operating head makes it possible in each of its positions to perform different successive operations on two adjacent stirrup-links. These operations are described hereunder, starting from the situation illustrated in FIG. 5.

Figure 5:
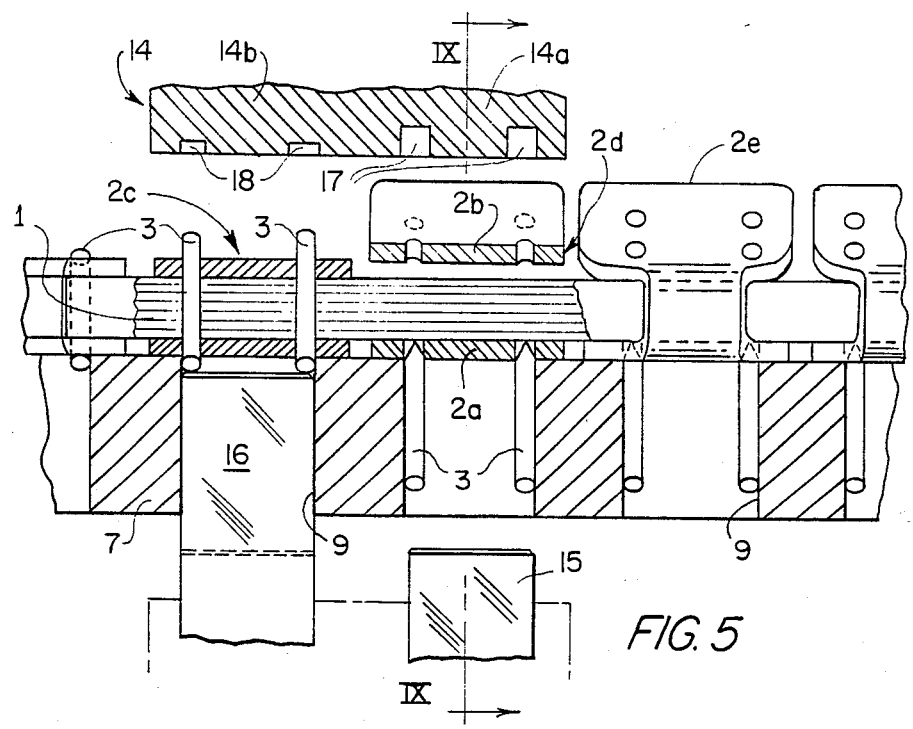
FIGS. 5 to 7 are schematic fragmentary longitudinal sectional views of the row of stirrup-links, which illustrate three successive operations performed in one and the same position of the operating head.

(1)—Forward displacement and immobilization of the operating head in a new position (FIG. 5)

For this purpose, it is necessary to actuate the second lever 20. This produces a one-step forward displacement of the operating head by means of the stepping-motion ratchet mechanism followed by immobilization of said operating head in a precise new operating position, positional locking being achieved by downward engagement of the second punch 16 within the opening 9 of the guide plate 7, namely the opening in which the staple-inserting punch 15 has previously been engaged.

As shown in FIG. 5, the second punch 16 is then brought to and maintained in a raised position in which it is capable of serving as a bearing anvil for the heads of the fastening staples 3 of the corresponding stirrup-link 2c, the projecting ends of said staples having already been subjected to initial clinching by bending-back to an angle of 45°.

It is worthy of note that the stirrup-link 2b located immediately in front of the preceding link (if the operating head is considered as moving in the direction of the arrow F) is still in its initial state and its upper arm is accordingly raised in the opened-out position whereas its fastening staples 3 are in the standby condition in readiness for insertion.

Figure 6:
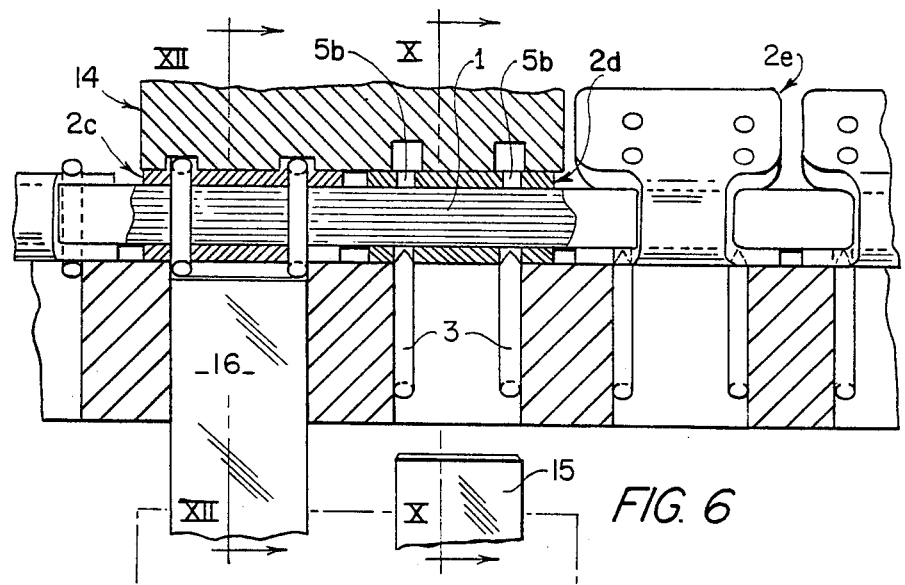

(2)—Final clinching of the projecting ends of the staples against a stirrup-link and closing of the adjacent stirrup-link (FIG. 6)

If the first control lever 19 is then actuated by the operator, this produces in a first stage the downward displacement of the die 14 in the direction of the arrow F1.

This in turn has the effect of carrying out two different operations on each of the two stirrup-links which are at that moment located within the operating head, namely the following operations:

(a) On the stirrup-link 2c which is located at the rear, the corresponding portion 14b of the die 14 performs the final clinching of the pointed ends 4 of the corresponding staples 3, this being achieved by means of the grooves 18 (as shown in FIG. 5). The punch 16 in this case performs the function of a bearing anvil for the heads of these staples.

Figure 10:
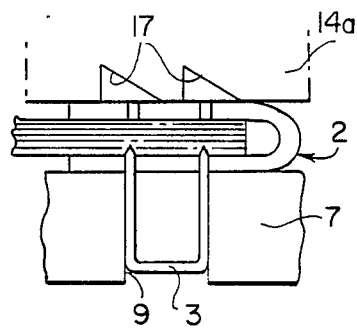

(b) on the stirrup-link 2d which is located in front, the downward displacement of the die 14 has the effect of bending-back the upper arm 2b of said stirrup-link against the conveyor belt 1, with the result that the through-holes 5b provided in this arm are from that time onwards located opposite to the points of the corresponding staples 3 (as shown in FIG. 10).

Figure 7:
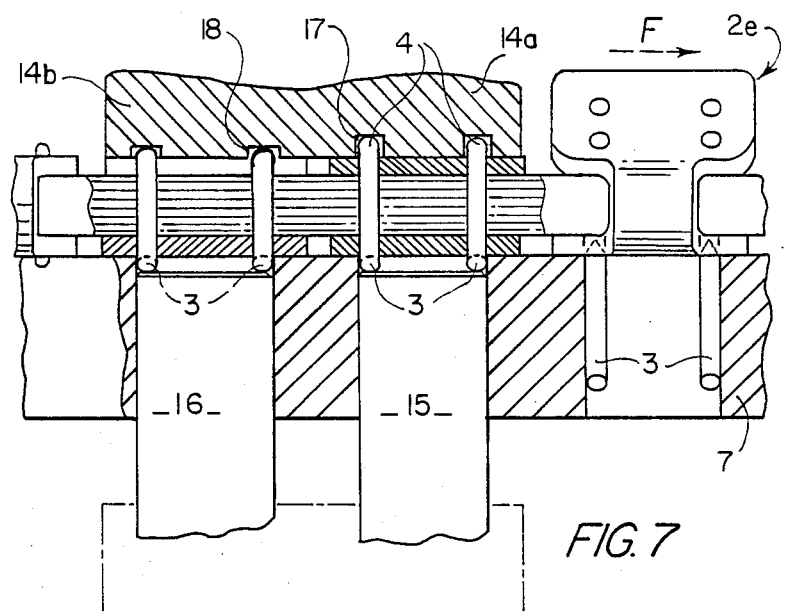

(3)—Insertion of fastening staples and initial clinching of staple ends (as shown in FIG. 7)

In the second part of its movement, the first lever 19 produces upward displacement of the punch 15 in the direction of the arrow F2. Under these conditions, this punch engages within the opening 9 of the guide plate 7, namely the opening located opposite to said punch, thus exerting a thrust on the corresponding staples 3 and inserting their points through the conveyor belt 1.

The pointed ends of these staples are thus caused to emerge through the holes 5b of the upper arm 2b of the stirrup-link 2d.

Under these conditions, the staple ends 4 penetrate into the grooves 17 of the corresponding portion 14a of the die. By reason of the fact that said grooves each have a sloping bottom face, the staple ends are subjected to incipient clinching in which they are bent-back so as to form a 45° elbow, as shown in FIG. 11.

Figure 8:
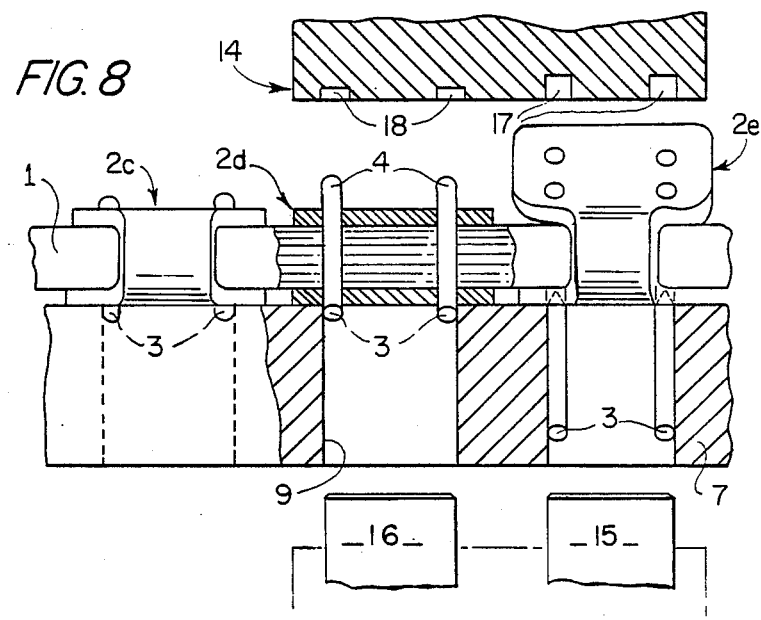
FIG. 8 is a similar view illustrating the displacement of said operating head in the position which immediately follows.

(4)—Change of position of the operating head (FIG. 8)

When the operations described in the foregoing have been completed, the operator returns the lever 19 to its rest position, thereby lifting the die 14 and downwardly displacing the staple-inserting punch 15. The operator then actuates the second lever 20 in order to produce a one-step forward displacement of the operating head.

This forward displacement is carried out during the first part of the movement of the lever 20 which, by actuating the stepping-motion ratchet mechanism (not shown), initiates displacement of the operating head in the direction of the arrow F over a distance which is just sufficient to ensure that the staple-inserting punch 15 is located opposite to the stirrup-link 2e which immediately follows the stirrup-link 2d and which has not yet been subjected either to a closing operation or to a fastening operation.

As shown in FIG. 8, the second punch 16 is located at this stage opposite to the stirrup-link 2d on which the projecting ends 4 of the fastening staples have already been subjected to initial clinching. Said punch 16 is then ready to engage in the corresponding opening of the guide plate 7 in order to perform the immobilization operation described earlier in paragraph 1, and so on in sequence.

It can readily be observed that the apparatus in accordance with the invention is very easy to use since it is only necessary to operate the two control levers 20 and 19 one after the other in order to carry out all the operations required for obtaining closure of a stirrup-link followed by insertion of the corresponding fastening staples and clinching of their projecting ends in two stages. It should be mentioned that these operations are obtained without any need to withdraw the conveyor belt while fastening operations are in progress in order to place a different anvil in position as is the required practice in certain current types of apparatus. Furthermore, the control mechanism of the movable die and staple-inserting punches is relatively simple and capable of highly efficient operation. Moreover, the control of the different operations by means of the two levers 19 and 20 instead of a single lever ensures optimum distribution of forces, with the result that the operator does not need to exert strenuous efforts when using the apparatus. Finally, the design concept of this apparatus permits a limitation of overall size and weight of the complete assembly. The apparatus may thus be readily transported to any service location, even to the bottom of a mine gallery.

As will be readily understood, the invention is not limited to the example of construction described in the foregoing. It is thus clearly apparent that the mechanical components for controlling the movable work tools could be replaced by different components if they are capable of performing the same function or in other words of producing two-stage operation of the respective elements to be controlled, namely the following: the die 14 and then the staple-inserting punch 15 in dependence on the lever 19, and the stepping-motion ratchet mechanism followed by the second immobilization punch 16 in dependence on the lever 20.

Figure 13:
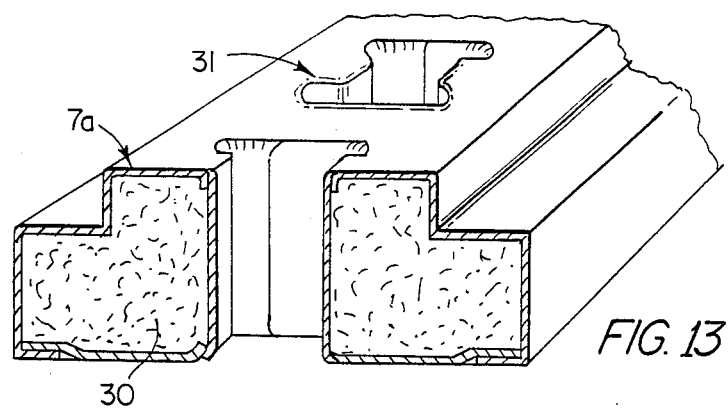
FIG. 13 is a view taken partly in perspective and partly in cross-section, and showing a particular form of construction of the plate which serves to guide the fastening staples while they are being inserted.
Figure 14:
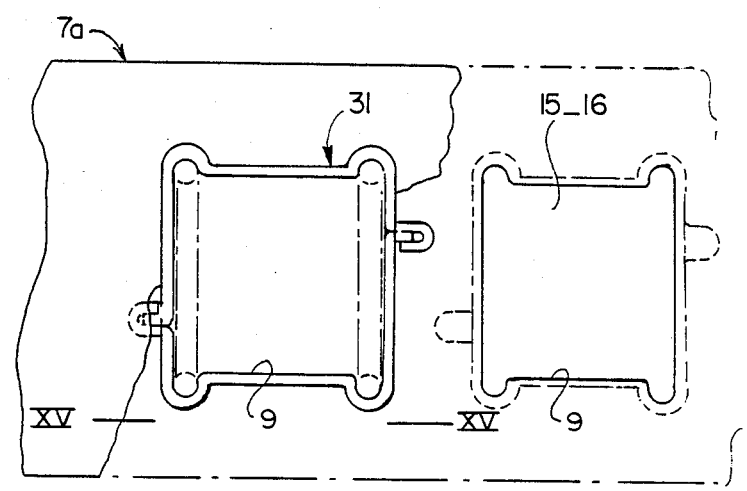
FIG. 14 is a fragmentary transverse sectional view taken along line XIV—XIV of FIG. 13.
Figure 15:
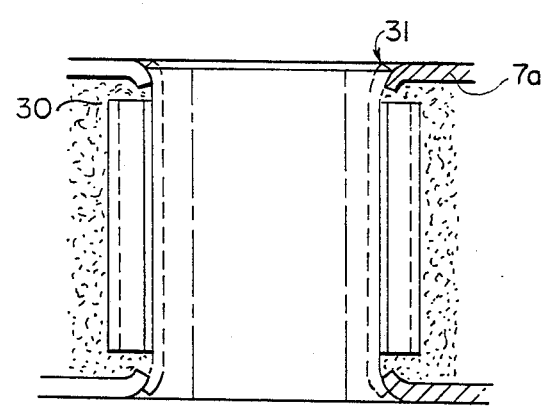
FIG. 15 is a fragmentary horizontal sectional view taken along line XV—XV of FIG. 14.

FIGS. 13 to 15 illustrate a particular form of construction of the staple-guiding plate which is so designed as to achieve a further weight reduction of the apparatus. In this form of construction, the guide plate is constituted by a metal casing 7A containing a packing 30 of cellular plastic. The guiding openings 9a provided in said plate are materialized by chimneys formed by two sheet metal members 31 in rigidly fixed relation, the ends of which are crimped against both faces of the metal casing 7A. These different chimneys are positioned within said metal casing prior to filling of this latter with the plastic packing 30.

The structure thus provided makes it possible to produce a plate 7a of substantial thickness which is perfectly capable of performing its function of guide plate for the fastening staples 3. In addition, this guide plate is of very lightweight construction, thus considerably reducing the weight of the entire structure and consequently facilitating both handling and transportation of the apparatus. A further advantage of this plate lies in the fact that its rigidity is as great as that of a metal plate having the same thickness.

If necessary, a guide plate of this type can be fabricated without making provision for the internal sheet metal members 31. In such a case, the guide plate is constituted simply by the external metal casing 7A and the internal packing 30 of cellular plastic. Prior to filling of the external casing 7A with packing material 30, there should be placed temporarily through the openings of both faces of said casing a corresponding number of packing punches for the purpose of reserving free passages which are capable of constituting the guide ducts provided in a plate of this type. If so required, the edges of the openings formed on both faces of the external casing can be bent-back towards the interior of the plate so as to form collars for guiding the staples at the time of insertion.

What is claimed is:
1. A portable apparatus for fastening on an end of a conveyor belt a row a stirrup-links provided with fastening staples placed in a standby position, each fastening staple having pointed ends and a head, said apparatus comprising:
   an operating head slidably mounted on a plate for guiding said fastening staples;
   a staple-inserting punch and a movable die providing on each side of the row of to be fastened stirrup-links for clinching the pointed ends of the staples;
   a ratchet mechanism for producing step-by-step motion of the operating head opposite to the to be fastened stirrup-links;
   wherein the movable die is made up of two separate and distinct possible, a first portion of said die being placed opposite to the staple-inserting punch and provided with grooves having sloping bottom faces for initial clinching of the ends of the fastening staples of a predetermined stirrup-link and a second portion of said die being provided with grooves for final clinching of the ends of the fastening staples of the following stirrup-link which have already been subjected to initial clinching; and
   wherein provision is made opposite to said second portion of the die for a second punch which is intended to penetrate into the corresponding opening of the staple-guiding plate both in order to arrest the operating head in the exact position desired and in order to serve as an anvil for bearing against the head of each corresponding staple at the time of final clinching of the staple points, said second punch being actuated by a lever which also actuates the stepping-motion ratchet mechanism while another lever controls the operation of the staple-inserting punch and the operation of the die.

2. A fastening apparatus according to claim 1, wherein the lever for operating the staple-inserting punch and the movable die is connected to these two elements by mechanical coupling means for successively producing a displacement of the movable die during the first part of its movement followed by a displacement of the staple-inserting punch during the second part of its movement.

3. A fastening apparatus according to claim 1, wherein the lever for actuating the stepping-motion ratchet mechanism and the second punch of the operating head is connected to these two elements by mechanical coupling means for successively producing a displacement of the stepping-motion ratchet mechanism followed by a displacement of the second punch having the intended function of immobilizing the operating head, the second punch also serving as an anvil for the heads of the staples employed for fastening one of the stirrup-links located within said operating head.

4. A fastening apparatus according to claim 1, wherein the body of the movable operating head is located in front of a face of the guide-plate opposite to the face which serves as a support for the row of stirrup-links to be fixed and the movable die is carried by a free end of a slider, an opposite end of said slider being driven by mechanical actuating means provided within said operating-head body.

5. A fastening apparatus according to claim 2, wherein the displacement of the staple-inserting punch and the displacement of a slider which carries the movable die are controlled by two cams provided on a rotatable plate which is rigidly fixed to the corresponding control lever.

6. A fastening apparatus according to claim 1, wherein the plate for guiding the staples during downward insertion of said staples is formed by a metal casing which contains a packing of cellular plastic, staple-guiding ducts being provided within the thickness of the plate thus formed.

7. A fastening apparatus according to claim 6, wherein chimneys of metal or any other suitable material are formed within the thickness of the staple-guiding plate.

* * * * *